United States Patent
Fausak et al.

(10) Patent No.: US 9,875,076 B1
(45) Date of Patent: Jan. 23, 2018

(54) REMOTING CLIENT HAVING GPU OFF-LOADER

(71) Applicant: Wyse Technology L.L.C., Santa Clara, CA (US)

(72) Inventors: Andrew Fausak, San Jose, CA (US); Oleg Rombakh, Los Gatos, CA (US); Richard Goldberg, Los Gatos, CA (US)

(73) Assignee: WYSE TECHNOLOGY L.L.C., Santa Clara, CA (US)

(*) Notice: Subject to any disclaimer, the term of this patent is extended or adjusted under 35 U.S.C. 154(b) by 70 days.

(21) Appl. No.: 15/220,373

(22) Filed: Jul. 26, 2016

(51) Int. Cl.
*G06F 3/14* (2006.01)
*G06F 9/44* (2006.01)
*G06T 1/60* (2006.01)

(52) U.S. Cl.
CPC .......... *G06F 3/1454* (2013.01); *G06F 9/4445* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 2010/0001995 A1* | 1/2010 | Hamill | ........... | G06T 15/005 345/419 |
| 2011/0141123 A1* | 6/2011 | Kumar | ........... | G06F 13/14 345/520 |
| 2011/0141133 A1* | 6/2011 | Sankuratri | ........... | G06F 3/1454 345/600 |
| 2012/0082395 A1* | 4/2012 | Abdo | ........... | H04N 19/13 382/239 |

* cited by examiner

*Primary Examiner* — Maurice L McDowell, Jr.
*Assistant Examiner* — Donna J Ricks
(74) *Attorney, Agent, or Firm* — Brian Tucker; Kirton McConkie

(57) ABSTRACT

A remoting client can be configured to offload various graphics-based remoting protocol processes to the GPU to thereby free up the CPU for performing other remoting tasks. In this way, a remoting client can be executed on a client terminal that has a less powerful CPU even when a graphics-rich desktop is virtualized on the client terminal. When the remoting client receives remoting communications containing graphics display data, the remoting client can write the graphics display data to a location in memory that is accessible to the GPU and can then pass the graphics display data to the GPU for further processing. The CPU is therefore freed from having to fully process the graphics display data including from having to copy the graphics display data to a display buffer.

20 Claims, 11 Drawing Sheets

REMOTING CLIENT HAVING GPU OFF-LOADER

CROSS-REFERENCE TO RELATED APPLICATIONS

N/A

BACKGROUND

The present invention is generally directed to a remoting client for use within a desktop virtualization environment (commonly referred to as virtual desktop infrastructure or VDI). In particular, the present invention is directed to a remoting client that is configured to offload various graphics-based remoting protocol processes to a graphics processing unit (GPU).

In a desktop virtualization environment, a desktop is hosted on a server but is made accessible on a client terminal by sending the desktop's graphical output to the client terminal for display. In this specification and the claims, the term "remoting" will be used to refer to this process of virtualizing a desktop on a client terminal. Remoting can be accomplished using a number of available protocols including ICA, RDP, VNC, PCoIP, etc. A remoting client executing on a client terminal can employ a remoting protocol to communicate with a corresponding remoting service executing on the server.

Regardless of the specific remoting protocol that is employed, the remoting service will send communications to the remoting client containing graphics display data and the remoting client will employ this graphics display data to render the desktop for display on the client terminal. In many cases, a large amount of processing must be performed by the remoting client to receive and handle these communications as well as to perform the other remoting tasks/processes. For example, the remoting protocol may employ encryption and/or compression techniques on all communications transferred to the remoting client. The remoting client may therefore need to decrypt and decompress any communication in order to identify the contents of the communication. Additionally, in many implementations, the contents of the communications may be graphics display data that is encoded. In such cases, the remoting client will be tasked with decoding the graphics display data to allow it to be displayed. Furthermore, in some implementations, there may be multiple different streams of communications that contain graphics display data (e.g., video data may be transported over one virtual channel while regular graphics data or cursor update data may be transmitted over another virtual channel) which can increase the amount of processing required to fully update the display of the desktop on the client side. In short, a remoting client typically must perform a substantial amount of processing to virtualize a desktop on the client terminal which can place a significant burden on the CPU.

It is becoming increasingly common to employ a VDI environment in corporate and other settings since it allows low cost client terminals (e.g., thin or zero clients) to be employed. However, these low cost client terminals oftentimes have CPUs with reduced processing power. In many cases, the CPUs on these low cost client terminals may not be capable of handling the load associated with virtualizing a desktop that provides a rich graphics experience. In particular, when graphics display data is transferred in an encoded format, the CPU may become overloaded during the decoding process which may cause the display to be updated less frequently than is desired, may cause keyboard and mouse input to lag, and/or may cause other performance issues.

BRIEF SUMMARY

The present invention extends to methods, systems, and computer program products for implementing a remoting client that is configured to offload various graphics-based remoting protocol processes to the GPU to thereby free up the CPU for performing other remoting tasks. In this way, a remoting client can be executed on a client terminal that has a less powerful CPU even when a graphics-rich desktop is virtualized on the client terminal.

When the remoting client receives remoting communications containing graphics display data, the remoting client can write the graphics display data to a location in memory that is accessible to the GPU and can then pass the graphics display data to the GPU for further processing. The CPU is therefore freed from having to fully process the graphics display data including from having to copy the graphics display data to a display buffer.

In one embodiment, the present invention is implemented as a method for offloading processing of graphics display data to a GPU to thereby minimize load on a CPU. A remoting client receives one or more remoting communications that include one or more sets of graphics display data pertaining to a remoted display. For each set of graphics display data, the remoting client stores the set in a memory location that is accessible to the GPU. The remoting client instructs the GPU to copy each set of graphics display data to a render texture representing the remoted display. After the GPU has copied each set of graphics display data to the render texture, the remoting client instructs the GPU to render the contents of the render texture to a display buffer. After the GPU has rendered the contents of the render texture to the display buffer, the remoting client instructs the GPU to copy the display buffer to a display surface thereby causing the rendered contents to be displayed on the display device.

In another embodiment, the present invention is implemented as computer storage media storing computer executable instructions which when executed on a client terminal implement a remoting client that is configured to perform a method for offloading processing of graphics display data to a GPU to thereby minimize load on a CPU. The method includes: receiving a first set of one or more remoting communications from a remoting service, the first set of one or more remoting communications including a first set of tiles pertaining to a first frame of a remoted display; storing each of the tiles in the first set in a memory location accessible to the GPU; instructing the GPU to copy each of the tiles in the first set to a render texture representing the remoted display; instructing the GPU to render the contents of the render texture to a display buffer such that each of the tiles in the first set is rendered to the display buffer to produce the first frame; and instructing the GPU to copy the display buffer to a display surface such that the first frame is displayed.

In another embodiment, the present invention is implemented as a client terminal having a CPU for executing a remoting client and a GPU. The remoting client is configured to perform a method for offloading processing of graphics display data to the GPU to thereby minimize load on the CPU. In response to receiving remoting communications that include graphics display data, the remoting client copies the graphics display data to memory. The remoting client calls a first function of the GPU to cause the GPU to copy the graphics display data to a render texture in GPU memory. The remoting client calls a second function of the GPU to cause the GPU to render the contents of the render texture to a display buffer, and then calls a third function of the GPU to cause the GPU to copy the display buffer to a display surface.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
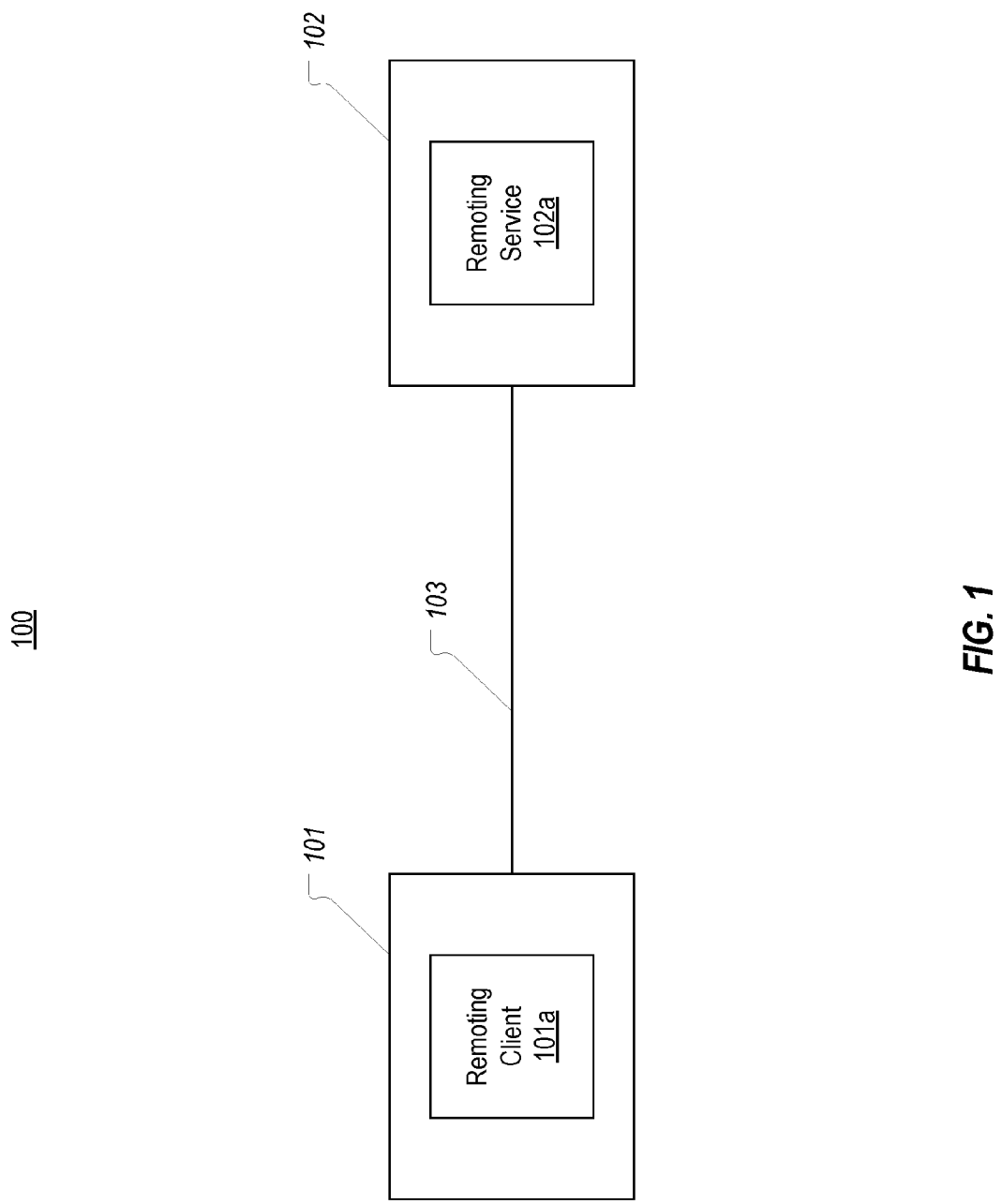
FIG. 1 illustrates an example computing environment in which the present invention can be implemented.

FIG. 1 provides an example of a computing environment 100 in which the present invention can be implemented. Computing environment 100 includes a server 102 that executes a remoting service 102a that is accessible via a network 103. Network 103 may represent any type of network including the internet or a local area network. Computing environment 100 also includes a client terminal 101 which executes a remoting client 101a that can establish a remote session with server 102 via remoting service 102a for the purpose of virtualizing a desktop on client terminal 101. Client terminal 101 can represent any type of computing device capable of executing remoting client 101a and communicating over network 103. As a non-limiting example, client terminal 101 may be a thin client. Although a single client terminal 101 is depicted, in many environments, multiple client terminals may concurrently connect to server 102 (e.g., server 102 may concurrently host many remote sessions). Since the present invention can be implemented independently of (and transparently to) remoting service 102a, an example using a single client terminal 101 will be employed in this specification.

Remoting client 101a and remoting service 102a can employ any remoting protocol to establish a connection over which remoting communications can be sent. For purposes of this specification and the claims, the term "remoting communication" will generally refer to any communication transmitted between remoting client 101a and remoting service 102a using a remoting protocol (e.g., PDUs in RDP-based implementations). For illustrative purposes, the specification will employ various examples where RDP is used as the remoting protocol. It is to be understood, however, that the present invention is remoting protocol agnostic.

Figure 2:
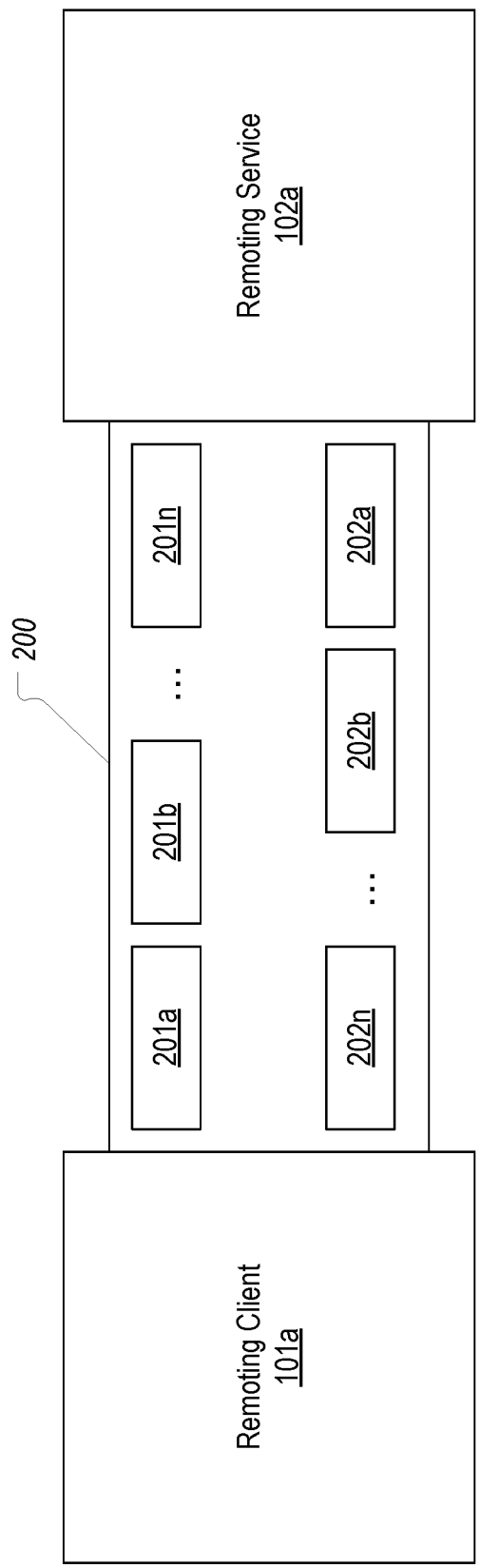
FIG. 2 illustrates how remoting communications are transferred between a remoting client and a remoting service.

Turning to FIG. 2, remoting client 101a and remoting service 102a are shown as having established a connection 200 over which a number of remoting communications are transferred. Remoting communications 201a-201n (where n represents any integer) represent remoting communications that are sent by remoting service 102a to remoting client 101a, while remoting communications 202a-202n represent remoting communications that are sent by remoting client 101a to remoting service 102a. By way of example, remoting communications 201a-201n can contain graphics display data, audio data, clipboard data, device redirection data, general control data, or any of the other types of data that are commonly sent by a remoting service. Also by way of example, remoting communications 202a-202n can contain keyboard or mouse data, device redirection data, general control data, etc.

The present invention is directed to optimizing the processing of a subset of remoting communications 201a-201n. More particularly, the present invention can optimize the handling of remoting communications received from remoting service 102a that contain graphics display data by offloading some of the processing of such remoting communications to the GPU. As an overview, when remoting client 101a determines that a particular remoting communication contains graphics display data, it can copy the graphics display data to a location in memory that is accessible to the GPU and then allow the GPU to complete the processing of the graphics display data. As a result, the CPU will not be required to fully process the graphics display data and will therefore be freed up to perform other tasks. Accordingly, terminal client 101 can employ a less powerful (i.e., less expensive) CPU while still providing acceptable performance.

FIGS. 3A-3D generally illustrate how remoting client 101a can handle a remoting communication received from remoting service 102a. In step 1, it is assumed that remoting client 101a receives a remoting communication 201a over connection 200. Remoting communication 201a has been encrypted and compressed in accordance with whatever parameters where specified during the establishment of connection 200. For example, in an RDP-based implementation, as part of establishing connection 200, remoting client 101a could have sent a Security Exchange PDU and a Client Info PDU to remoting service 102a to advertise the remoting client's encryption and compression capabilities. In response, remoting service 102a could have selected a particular encryption method and a particular compression method to be employed for subsequent transmission of remoting communications including remoting communication 201a. Accordingly, remoting client 101a can be configured to employ the appropriate decryption and decompression method to extract the payload from remoting communications. It is noted, however, that in some implementations, a remoting communication may only be encrypted, may only be compressed, or may neither be encrypted nor compressed. In any of these instances, the present invention may still be employed.

Based on the assumption that remoting communication 201a is both encrypted and compressed when received at remoting client 101a, in step 2, remoting client 101a can use the proper methods to decrypt and decompress the content of remoting communication 201*a*. Then, with the content decrypted and decompressed, remoting client 101*a* can examine the content to determine, in step 3, what type of data it is (e.g., by examining headers of the content (not shown)). If the content is not graphics display data, remoting client 101*a* can process the content in a typical fashion. For example, if the content pertains to a redirected device, the content can be routed towards a driver stack, or if the content is connection control data, connection 200 can be updated accordingly. In each of these examples, the CPU of client terminal 101 would be tasked with processing the content.

If, however, remoting client 101*a* determines that the content of remoting communication 201*a* is graphics display data, it can copy the graphics display data to a buffer in virtual memory 300 as represented in step 4. Virtual memory 300 can represent a location of memory that is accessible to the GPU (e.g., via DMA). Although not shown, the graphics display data may oftentimes be encoded (an example of which is provided below), and in such cases, remoting client 101*a* can decode the graphics display data and store the decoded graphics display data in virtual memory 300. It is noted that, at this point, remoting client 101*a* has substantially completed its portion of the processing of the graphics display data. In other words, the primary role of remoting client 101*a* is to extract the graphics display data from remoting communication, decode the graphics display data if necessary, and store the graphics display data in a location of memory that is accessible to the GPU.

Figure 3A:
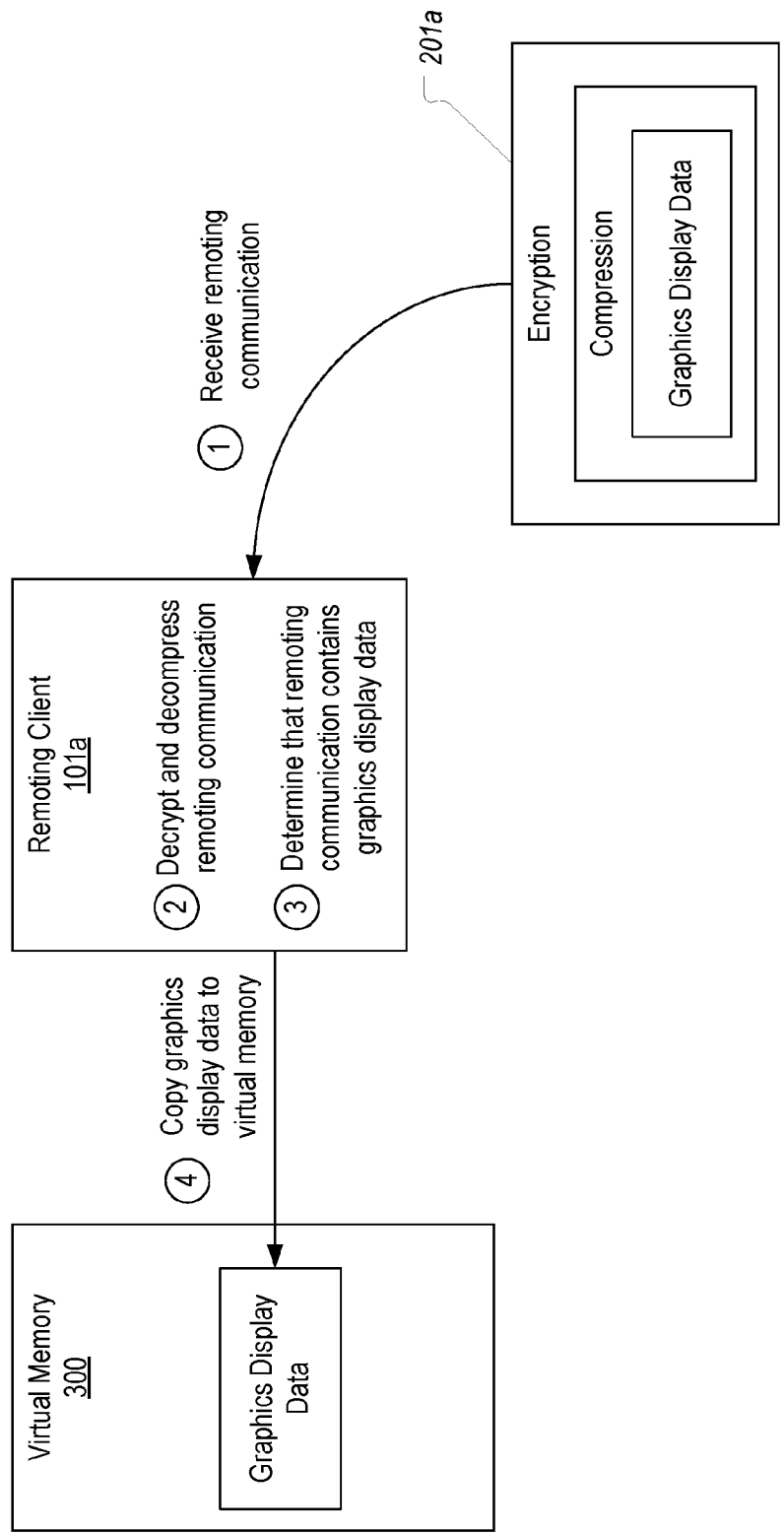
FIGS. 3A-3D generally illustrate a process by which a remoting client offloads the processing of graphics display data to the GPU.
Figure 3B:
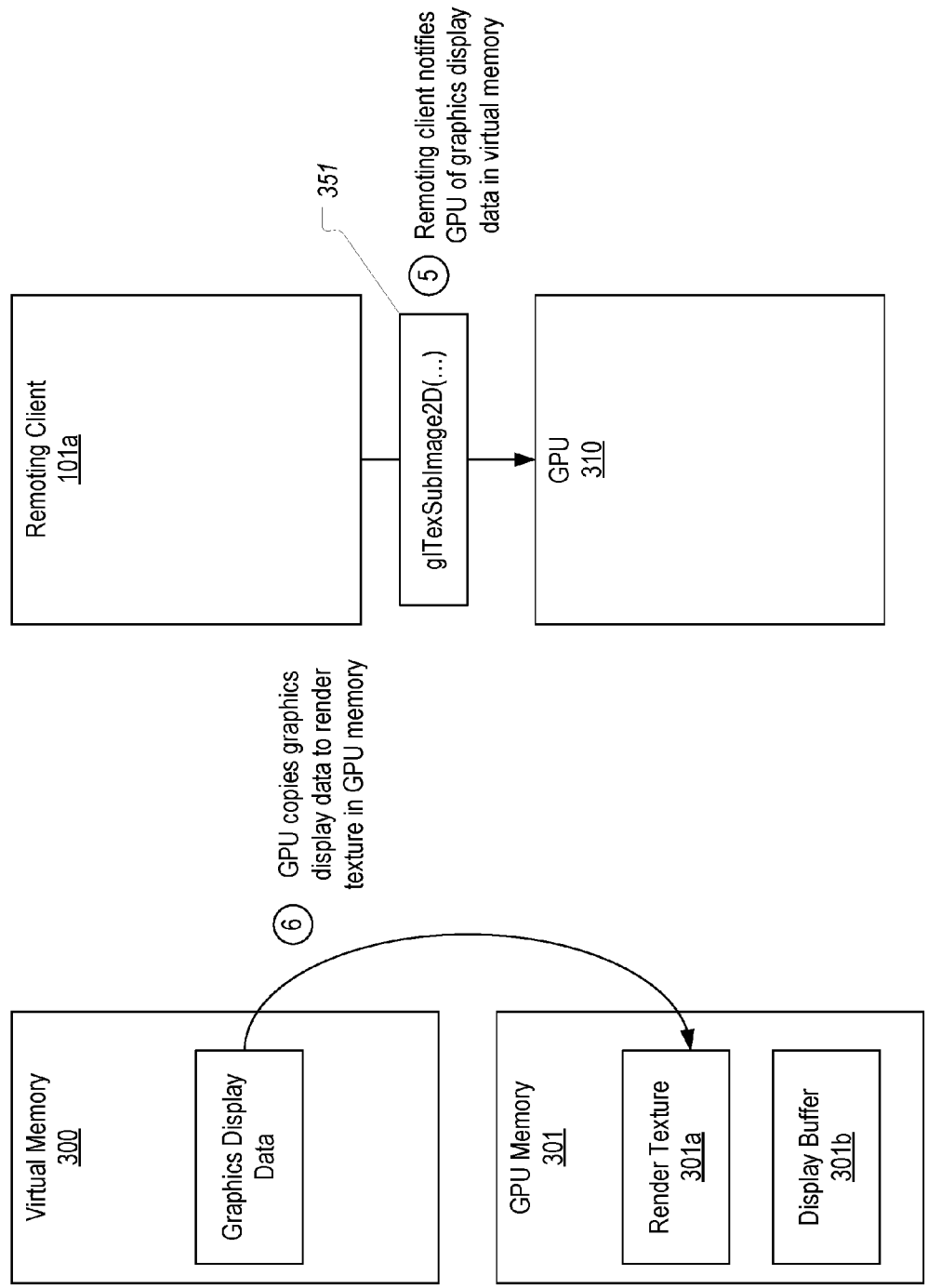

Turning to FIG. 3B, after remoting client 101*a* has copied the graphics display data to virtual memory 300, it can notify GPU 310 of the graphics display data and request that the GPU copy the graphics display data to a render texture 301*a* in GPU memory 301 in step 5. Render texture 301*a* can represent the entire desktop view that is being remoted to client terminal 101 or a view of a window when only an application is being remoted (e.g., in RemoteApp scenarios). In some embodiments, such as is depicted in step 5, remoting client 101*a* can employ the glTexSubImage2D function of the OpenGL specification to request this copying of the graphics display data to render texture 301*a*. As represented in step 6, in response to this function call, GPU 310 can use DMA to retrieve the graphics display data from virtual memory 300 and copy it to render texture 301*a* in GPU memory 301. Because this copy is performed by GPU 310 via DMA, the CPU will not be tasked with performing the copy.

For simplicity, this example assumes that only a single set of graphics display data is received and processed. However, as will be further described below, steps 1-6 could be performed for each of a number of remoting communications that include graphics display data. Also, remoting communications may typically include multiple sets of graphics display data (e.g., multiple tiles), and therefore, steps 4-6 could be performed multiple times for such remoting communications. In short, for each set of graphics display data (e.g., for each tile) that is received, remoting client 101*a* can copy (after possibly decoding) the graphics display data to virtual memory 300 and then call glTexSubImage2D (or another similar function) to cause GPU 310 to copy the graphics display data to render texture 301*a*. In this way, changes to a remoted desktop or application window can be accumulated into render texture 301*a* until it is desired to output the accumulated changes (e.g., after all changes representing the next frame have been accumulated or after a specified amount of time).

Figure 3C:
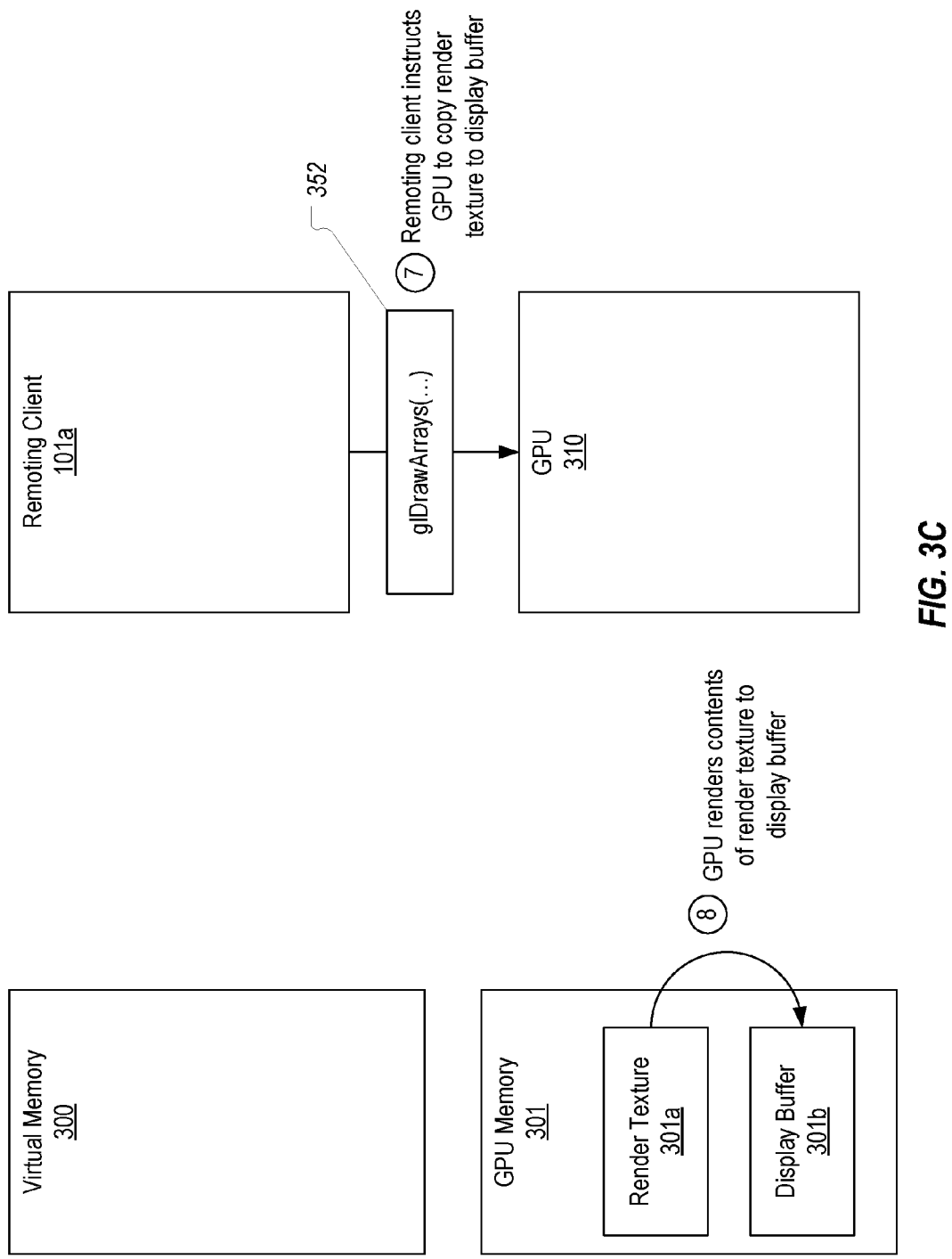
Figure 3D:
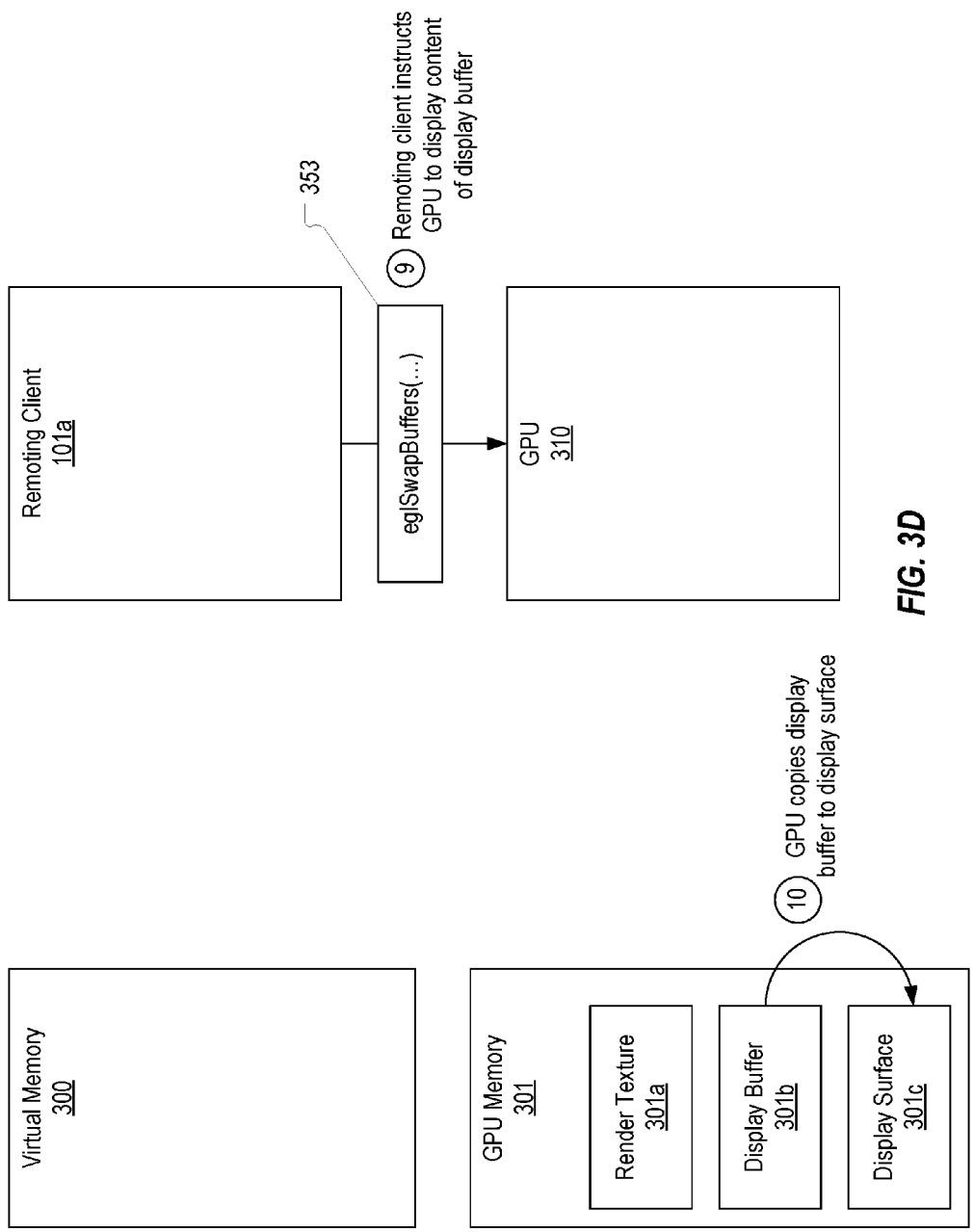

Turning to FIG. 3C, once remoting client 101*a* determines that it is time to update the display, it can instruct GPU 310 to copy render texture 301*a* to display buffer 301*b* in step 7.

As shown, in some embodiments, remoting client 101*a* can accomplish this by calling the glDrawArrays function (or similar function) to request that GPU 310 render the contents of render texture 301*a* to display buffer 301*b*. In this way, each set of graphics display data that has been accumulated into render texture 301*a* can be copied/rendered into display buffer 301*b*.

In conjunction with requesting the copying of render texture 301*a* to display buffer 301*b*, remoting client 101*a* can also instruct GPU 310 to output display buffer 301*b* to the screen (e.g., to the portion of the screen encompassed by the remoted desktop or application). For example, as shown in step 9 in FIG. 3D, after successfully calling glDrawArrays, remoting client 101*a* can call the eglSwapBuffers function (or similar function). In response, in step 10, GPU 310 will post the contents of display buffer 301*b* to display surface 301*c* which is assumed to be the surface representing the display device on which the remoted desktop or application is being displayed.

The determination of when to call glDrawArrays and eglSwapBuffers (which would be called together each time it is desired to update the display) may vary depending on which remoting protocol or remoting protocol extension is employed to transfer the graphics display data. For example, some protocol extensions employ structures to identify the beginning and ending of a frame. In such cases, remoting client 101*a* can call glDrawArrays and eglSwapBuffers once the end frame structure is received (and once all graphics display data pertaining to that particular frame has been received and copied to render texture 301*a*). In other cases, the protocol extension may not provide an indication of when graphics display data pertaining to a single frame has been transferred. In these cases, remoting client 101*a* may be configured to periodically call glDrawArrays and eglSwapBuffers to update the display with whatever graphics display data has been received and accumulated to that point (e.g., every 30 ms).

Figure 4A:
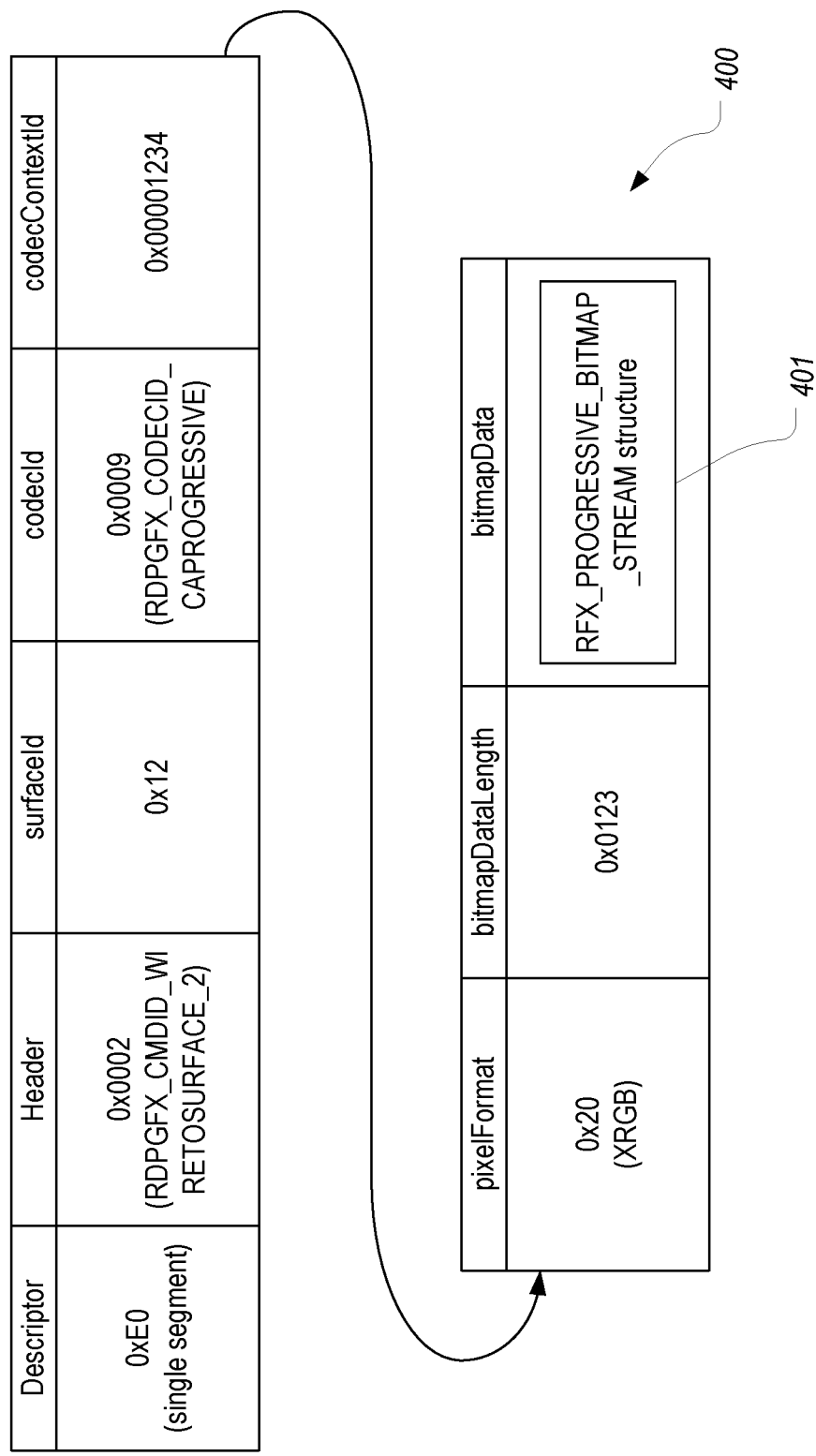
FIGS. 4A and 4B illustrate an example of a remoting communication that includes graphics display data that can be processed in accordance with the techniques of the present invention.
Figure 4B:
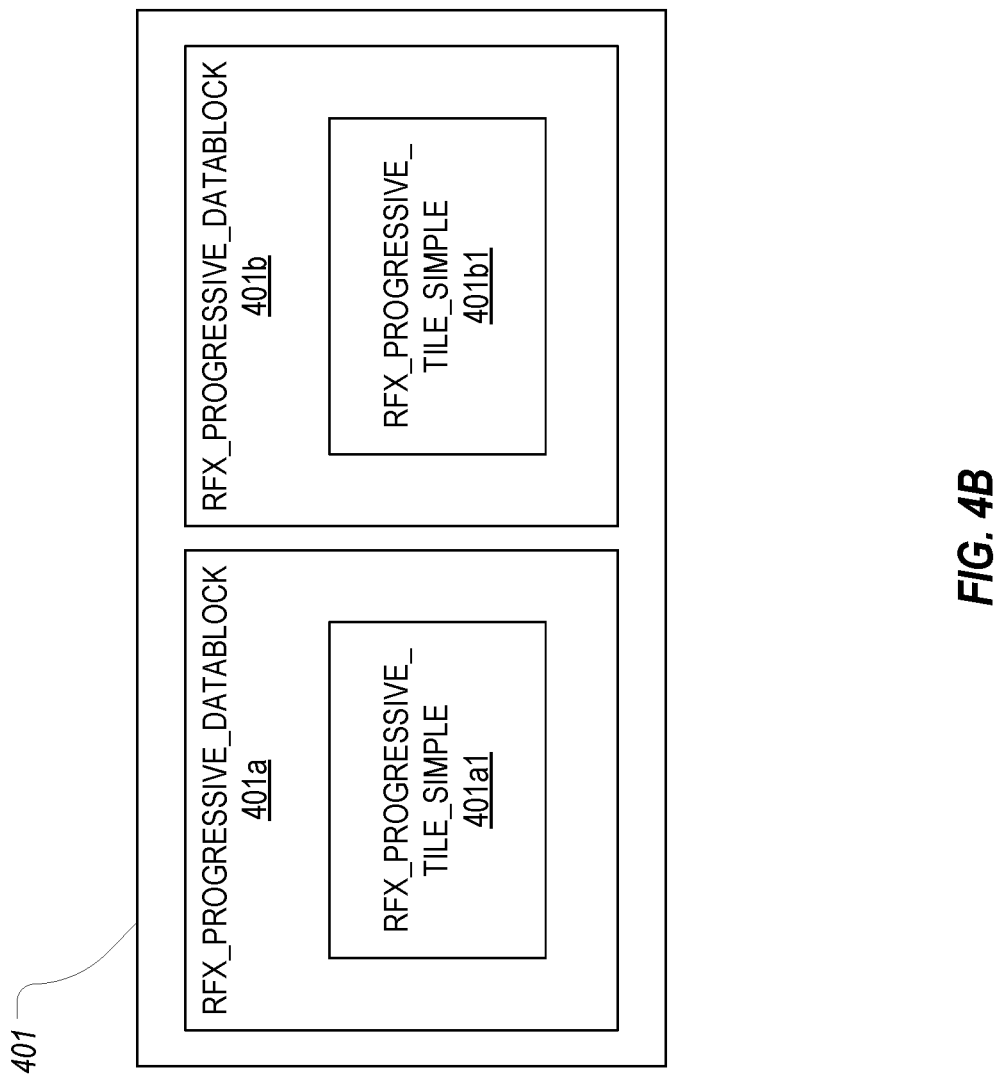

FIGS. 4A and 4B provide a more detailed example of content 400 of a remoting communication such as remoting communication 201*a*. For this example, it will be assumed that any encryption and/or compression of communication 201*a* have been reversed, and therefore FIG. 4 can represent the state of remoting communication 201*a* after step 2 of FIG. 3. For illustrative purposes only, this example will be based on the Remote Desktop Protocol: Graphics Pipeline Extension. Therefore, content 400 can represent an RDP_SEGMENTED_DATA structure. Although an RDP_SEGMENTED_DATA structure can include one or more graphics messages, it will be assumed that content 400 includes a single graphics message (as defined by the descriptor having a value of 0xE0).

As shown, content 400 can include a header which defines the type of graphics message and various other fields based on this type. In this example, it will be assumed that the message type is one that is used to transfer encoded bitmap data such as an RDPGFX_WIRE_TO_SURFACE_PDU_2 message as represented by the header value of 0x0002. Because content 400 pertains to a RDPGFX_WIRE_TO_SURFACE_PDU_2 graphics message, the header will be followed by a surface identifier (which is assumed to be 0x12 in this example and, referring to the example in FIG. 3D, could identify display surface 301*c*), a codec identifier of 0x0009 (which defines the RemoteFX Progressive Codec), a compression context associated with the encoded bitmap data (which is assumed to be 0x00001234), a pixel format (which is assumed to XRGB as defined by the value 0x20), a length of the encoded bitmap data (which is assumed to be 0x0123), and the encoded bitmap data (which is encapsulated in an RFX_PROGRESSIVE_BITMAP_STREAM structure).

As stated above, after performing the preprocessing of remoting communication 201a to yield content 400 in an accessible (i.e., decrypted and decompressed) form, remoting client 101a (or more particularly, a handler for the dynamic virtual channel used to transmit graphics messages to which the decrypted and decompressed content could be routed) can further evaluate content 400 to determine how it should be processed. In this example, remoting client 101a can determine that content 400 includes an RFX_PROGRESSIVE_BITMAP_STREAM structure 401 that will require further processing. In accordance with the Remote Desktop Protocol: Graphics Pipeline Extension, an RFX_PROGRESSIVE_BITMAP_STREAM structure encapsulates regions of a graphics frame compressed using discrete wavelet transforms, sub-band diffing, and progressive compression techniques. The structure itself can contain one or more RFX_PROGRESSIVE_DATABLOCK structures as is known in the art.

Turning to FIG. 4B, for purposes of this example and for simplicity, RFX_PROGRESSIVE_BITMAP_STREAM structure 401 is shown as including only two RFX_PROGRESSIVE_DATABLOCK structures 401a, 401b each of which includes an RFX_PROGRESSIVE_TILE_SIMPLE structure 401a1, 401b1 respectively. This is only one possible example of how graphics display data can be encapsulated and should not be viewed as limiting the present invention. For example, graphics display data could be defined within RFX_PROGRESSIVE_REGION structures. Although not shown, RFX_PROGRESSIVE_BITMAP_STREAM structure 401 may also include structures which define the beginning and ending of a frame. Such structures would presumably be positioned before and after structures 401a and 401b (and any other structures in structure 401 which may contain graphics display data (or tiles)).

As described above, when remoting client 101a receives a remoting communication containing content 400, it can extract RFX_PROGRESSIVE_BITMAP_STREAM structure 401 and process each RFX_PROGRESSIVE_DATABLOCK structure it contains. With reference to FIG. 4B, this processing can include decoding each of RFX_PROGRESSIVE_TILE_SIMPLE structures (or tiles) 401a1 and 401b1 and copying the decoded content to virtual memory 300.

Figure 5A:
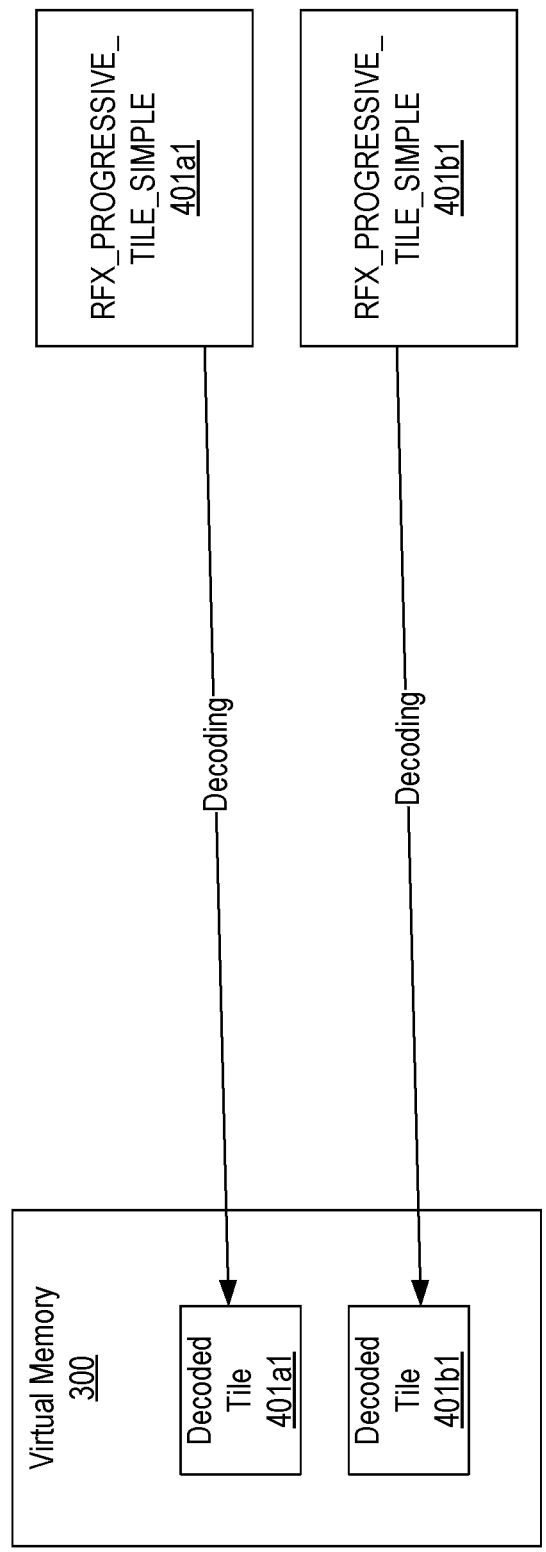
FIGS. 5A and 5B generally illustrate how the graphics display data of FIG. 5B can be processed.

FIG. 5A represents how this decoding and copying of the tiles can occur. In a similar manner as was described with reference to FIG. 3A, remoting client 101a can extract the contents of tile 401a1, decode it, and store the decoded tile 401a1 in virtual memory 300 where it can later be accessed by GPU 310. Remoting client 101a can perform similar processing to store decoded tile 401b1 in virtual memory 300. It is noted that, in typical implementations where the remoted display is constantly being updated, remoting client 101a would continuously perform this type of processing on the stream of encoded tiles that it would receive from remoting service 102a. In other words, remoting client 101a can continuously extract, decode, and copy tiles to virtual memory 300. Therefore, even though FIG. 5A depicts only two tiles being processed, in some embodiments, a large number of tiles may be involved.

In conjunction with copying tiles 401a1 and 401b1 to virtual memory 300, remoting client 101a can also cause GPU 310 to copy tiles 401a1 and 401b1 to the appropriate render texture (e.g., by calling glTexSubImage2D for each of tiles 401a1 and 401b1 with an input parameter identifying the render texture). In this way, remoting client 101a (and therefore the CPU) will offload to GPU 310 the process of assembling the tiles. Given that copying tiles is a processing-intensive process, this offloading can greatly improve the CPU's performance. Stated another way, calling glTexSubImage2D for each tile requires much less processing than assembling the tiles.

Figure 5B:
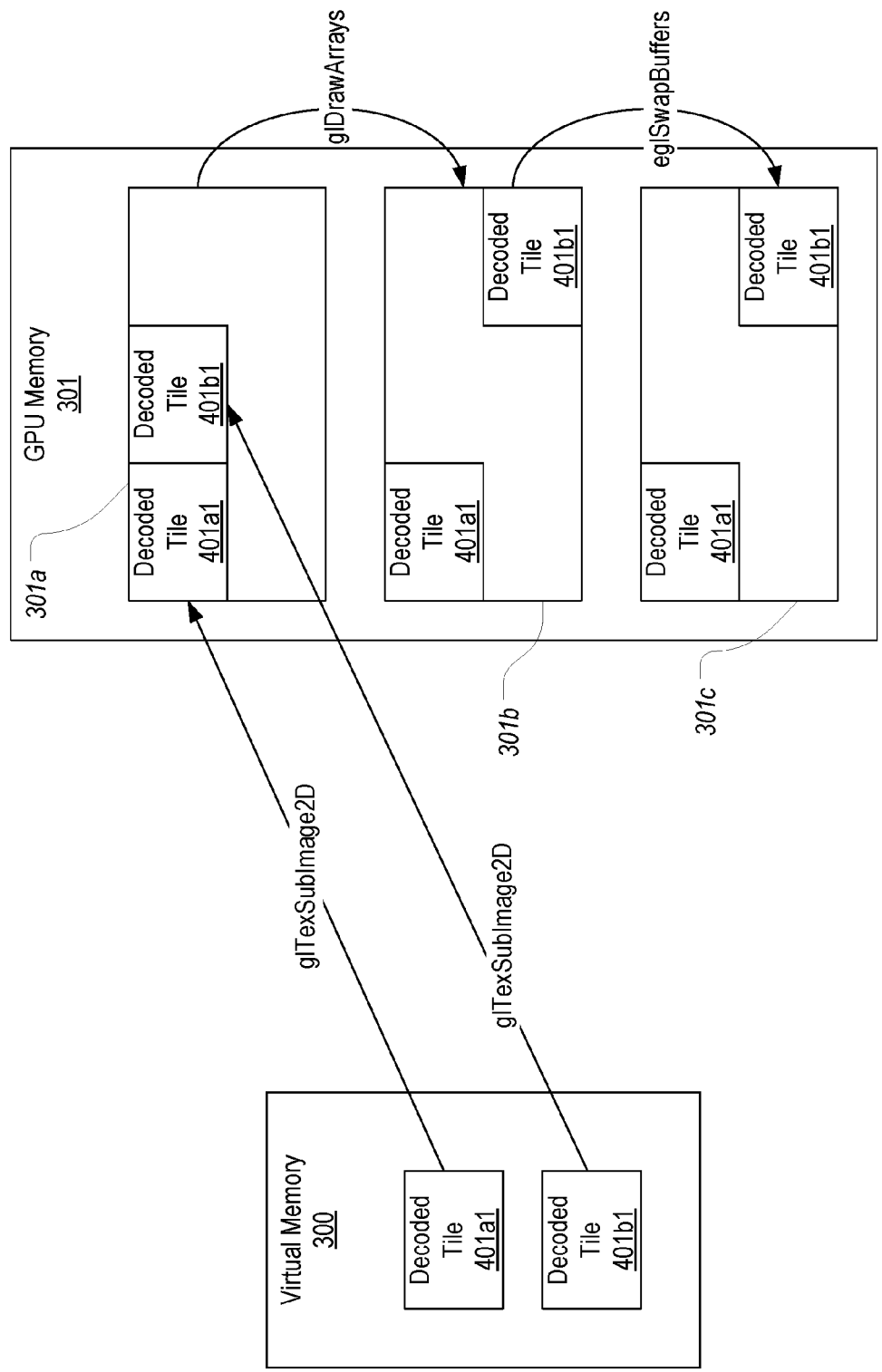

Turning now to FIG. 5B, it can be assumed that, during the processing of RFX_PROGRESSIVE_BITMAP_STREAM structure 401 (or possibly a subsequently received RFX_PROGRESSIVE_BITMAP_STREAM structure), remoting client 101a encounters an RFX_PROGRESSIVE_FRAME_END structure which serves as an indication from remoting service 102a that each tile pertaining to the current frame (i.e., the frame to which tiles 401a1 and 401b1 pertain) has been transmitted. In response, remoting client 101a can instruct GPU 310 to render tiles 401a1 and 401b1 (and any other tiles that may have been copied to the same render texture) to the display buffer (e.g., by calling glDrawArrays) and to output the rendered content (e.g., by calling eglSwapBuffers). Because the rendering of the tiles to the display buffer is performed by the GPU, the CPU is again freed from performing such processing.

To summarize, the CPU can be tasked with decoding tiles (or sets of graphics display data) into virtual memory and then "uploading" the decoded tiles to the GPU. The CPU can then allow the GPU to handle the remaining processing including by instructing the GPU when to draw and swap the display buffer. By implementing this offloading, the amount of processing that the CPU must perform when a display is remoted to a client terminal is reduced. Because the CPU is not tasked with copying graphics display data to a display buffer, an increase in performance of at least 50% can be achieved in many implementations.

Figure 6:
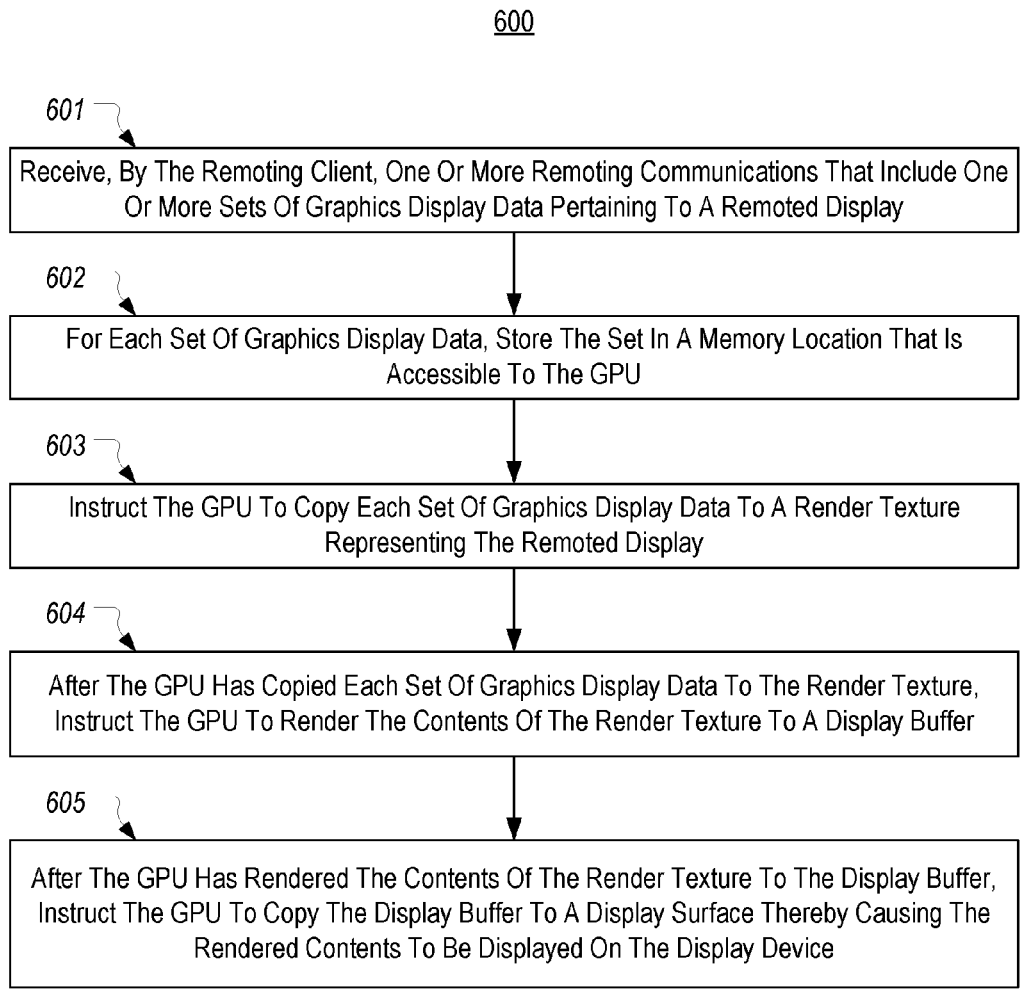
FIG. 6 illustrates a flowchart of an example method for offloading processing of graphics display data to a GPU.

FIG. 6 provides a flowchart of an example method 600 for offloading processing of graphics display data to a GPU to thereby minimize load on a CPU. Method 600 can be implemented by remoting client 101a and will be described with reference to FIGS. 3A-3D.

Method 600 includes an act 601 of receiving, by the remoting client, one or more remoting communications that include one or more sets of graphics display data pertaining to a remoted display. For example, remoting client 101a can receive remoting communication 201a.

Method 600 includes an act 602 of, for each set of graphics display data, storing the set in a memory location that is accessible to the GPU. For example, remoting client 101a can store one or more sets of graphics display data in virtual memory 300.

Method 600 includes an act 603 of instructing the GPU to copy each set of graphics display data to a render texture representing the remoted display. For example, remoting client 101a can call the glTexSubImage2D for each set of graphics display data in virtual memory 300 to cause GPU 310 to use DMA to copy each set into render texture 301a.

Method 600 includes an act 604 of, after the GPU has copied each set of graphics display data to the render texture, instructing the GPU to render the contents of the render texture to a display buffer. For example, remoting client 101a can call the glDrawArrays function to cause the contents of render texture 301a to be rendered or copied to display buffer 301b.

Method 600 includes an act 605 of, after the GPU has rendered the contents of the render texture to the display buffer, instructing the GPU to copy the display buffer to a display surface thereby causing the rendered contents to be displayed on the display device. For example, remoting client 101a can call the eglSwapBuffers function to cause the display buffer 301b to be swapped to display surface 301c.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a remoting client executing on a client terminal that includes a display device, for offloading processing of graphics display data to a graphics processing unit (GPU) to thereby minimize load on a central processing unit (CPU), the method comprising:

receiving, by the remoting client, one or more remoting communications that include one or more sets of graphics display data pertaining to a remoted display;

for each set of graphics display data, storing the set in a memory location that is accessible to the GPU;

instructing the GPU to copy each set of graphics display data to a render texture representing the remoted display;

after the GPU has copied each set of graphics display data to the render texture, instructing the GPU to render the contents of the render texture to a display buffer; and after the GPU has rendered the contents of the render texture to the display buffer, instructing the GPU to copy the display buffer to a display surface thereby causing the rendered contents to be displayed on the display device.

2. The method of claim 1, wherein the one or more sets of graphics display data are encoded, and wherein storing each set of graphics display data in a memory location accessible to the GPU comprises decoding each set.

3. The method of claim 1, wherein instructing the GPU to copy each set of graphics display data to a render texture representing the remoted display comprises calling, for each set, a function that causes the GPU to perform direct memory access to copy the set to the render texture.

4. The method of claim 3, wherein the render texture is stored in GPU memory.

5. The method of claim 1, wherein each set of graphics display data is a tile pertaining to a particular area of a frame.

6. The method of claim 1, wherein the remoting client instructs the GPU to render the contents of the render texture to the display buffer in response to receiving an end of frame indication.

7. The method of claim 1, wherein the remoting client instructs the GPU to render the contents of the render texture to the display buffer after a specified duration of time has elapsed since a previous instruction to render the contents of the render texture to the display buffer was provided to the GPU.

8. The method of claim 1, wherein the remoting client instructs the GPU to render the contents of the render texture to the display buffer after having instructed the GPU to copy multiple sets of graphics display data to the render texture.

9. The method of claim 1, wherein the remoted display encompasses an entire desktop or a single application.

10. The method of claim 1, further comprising:

receiving, by the remoting client, one or more additional remoting communications that include one or more additional sets of graphics display data pertaining to the remoted display;

for each additional set of graphics display data, storing the additional set in a memory location that is accessible to the GPU;

after the GPU has rendered the contents of the render texture to the display buffer, instructing the GPU to copy each additional set of graphics display data to the render texture; and after the GPU has copied each additional set of graphics display data to the render texture, instructing the GPU to render the contents of the render texture to the display buffer and then instructing the GPU to copy the display buffer to the display surface.

11. One or more computer storage media storing computer executable instructions which when executed on a client terminal implement a remoting client that is configured to perform a method for offloading processing of graphics display data to a GPU to thereby minimize load on a CPU, the method comprising:

receiving a first set of one or more remoting communications from a remoting service, the first set of one or more remoting communications including a first set of tiles pertaining to a first frame of a remoted display;

storing each of the tiles in the first set in a memory location accessible to the GPU;

instructing the GPU to copy each of the tiles in the first set to a render texture representing the remoted display;

instructing the GPU to render the contents of the render texture to a display buffer such that each of the tiles in the first set is rendered to the display buffer to produce the first frame; and instructing the GPU to copy the display buffer to a display surface such that the first frame is displayed.

12. The computer storage media of claim 11, wherein the method further comprises:

receiving a second set of one or more remoting communications from the remoting service, the second set of one or more remoting communications including a second set of tiles pertaining to a second frame of the remoted display;

storing each of the tiles in the second set in a memory location accessible to the GPU;

instructing the GPU to copy each of the tiles in the second set to the render texture;

instructing the GPU to render the contents of the render texture to the display buffer such that each of the tiles in the second set is rendered to the display buffer to produce the second frame; and instructing the GPU to copy the display buffer to the display surface such that the second frame is displayed.

13. The computer storage media of claim 12, wherein the tiles in the first and second set are encoded, and wherein storing the tiles in the memory location accessible to the GPU comprises decoding the tiles.

14. The computer storage media of claim 12, wherein the remoting client instructs the GPU to render the contents of the render texture to the display buffer and to copy the display buffer to the display surface in response to receiving an end of frame indication.

15. The computer storage media of claim 12, wherein the remoting client instructs the GPU to copy each of the tiles in the second set to the render texture after each of the tiles in the first set has been rendered to the display buffer to produce the first frame.

16. The computer storage media of claim 11, wherein the remoted display encompasses an entire desktop or a single application.

17. The computer storage media of claim 11, wherein the tiles are encoded in accordance with a progressive codec.

18. A client terminal having a CPU for executing a remoting client and a GPU, the remoting client being configured to perform a method for offloading processing of graphics display data to the GPU to thereby minimize load on the CPU, the method comprising:

in response to receiving remoting communications that include graphics display data, copying the graphics display data to memory;

calling a first function of the GPU to cause the GPU to copy the graphics display data to a render texture in GPU memory;

calling a second function of the GPU to cause the GPU to render the contents of the render texture to a display buffer; and calling a third function of the GPU to cause the GPU to copy the display buffer to a display surface.

19. The client terminal of claim 18, wherein the graphics display data comprises a plurality of tiles, and wherein the first function of the GPU is called once for each tile.

20. The client terminal of claim 18, wherein the second and third functions are called either in response to receiving an end of frame indication or after a period of time has elapsed.

* * * * *